US012552176B2

(12) United States Patent
Suzuki et al.

(10) Patent No.: US 12,552,176 B2
(45) Date of Patent: Feb. 17, 2026

(54) INKJET PRINTING APPARATUS

(71) Applicant: SCREEN Holdings Co., Ltd., Kyoto (JP)

(72) Inventors: Yuto Suzuki, Kyoto (JP); Hideaki Onishi, Kyoto (JP); Takanori Tsuji, Kyoto (JP); Noboru Hamaguchi, Kyoto (JP); Akihiro Ogawa, Kyoto (JP); Miki Nakagawa, Kyoto (JP); Mitsuru Tanemoto, Kyoto (JP); Takaharu Yamamoto, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 145 days.

(21) Appl. No.: 18/399,341

(22) Filed: Dec. 28, 2023

(65) Prior Publication Data

US 2024/0246342 A1 Jul. 25, 2024

(30) Foreign Application Priority Data

Jan. 23, 2023 (JP) ................................ 2023-008293

(51) Int. Cl.
*B41J 2/175* (2006.01)
*B41J 2/185* (2006.01)
*B41J 2/19* (2006.01)

(52) U.S. Cl.
CPC ....... *B41J 2/17596* (2013.01); *B41J 2/17563* (2013.01); *B41J 2/17566* (2013.01); *B41J 2/185* (2013.01); *B41J 2/19* (2013.01)

(58) Field of Classification Search
CPC . B41J 2/175; B41J 2/18; B41J 2/17596; B41J 2/17566; B41J 2/19; B41J 2/17513; B41J 2/17563; B41J 2/17523; B41J 2/17506; B41J 2/185; B41J 2/17556; B41J 29/38; B41J 2202/12; B41J 29/393
See application file for complete search history.

(56) References Cited

U.S. PATENT DOCUMENTS

2011/0285767 A1* 11/2011 Tanaka ..................... B41J 2/175 347/6
2016/0001570 A1* 1/2016 Okayama .................. B41J 2/18 347/92

FOREIGN PATENT DOCUMENTS

JP 2022-114197 A 8/2022

* cited by examiner

*Primary Examiner* — Jannelle M Lebron
(74) *Attorney, Agent, or Firm* — Rimon P.C.

(57) ABSTRACT

An inkjet printing apparatus includes a discharge head configured to discharge ink, a supply tank in which ink supplied to the discharge head is stored, a collecting tank in which ink collected from the discharge head is stored, a connecting pipe connecting the supply tank and the collecting tank, a circulation pump that is interposed in the connecting pipe and is configured to deliver ink from the collecting tank to the supply tank, a replenishment tank in which ink with which the supply tank is replenished is stored, a replenishment pipe connecting the replenishment tank and the connecting pipe, and a replenishment pump that is interposed in the replenishment pipe and is configured to deliver ink from the replenishment tank to the connecting pipe. A connection point of the replenishment pipe and the connecting pipe is positioned between the circulation pump and the supply tank.

12 Claims, 6 Drawing Sheets

INKJET PRINTING APPARATUS

RELATED APPLICATIONS

This application claims the benefit of Japanese Application No. 2023-008293, filed on Jan. 23, 2023, the disclosure of which is incorporated by reference herein.

BACKGROUND OF THE INVENTION

Field of the Invention

The present invention relates to an inkjet printing apparatus that discharges ink onto a printing medium such as paper to perform printing.

Description of the Background Art

Conventionally, an inkjet printing apparatus includes a circulation path in which ink is supplied to a discharge head configured to discharge ink onto a printing medium and ink being kept undischarged in the discharge head is collected and again supplied to the discharge head, in some cases. An inkjet printing apparatus including such an ink circulation path as mentioned above is described in, for example, Japanese Patent Application Publication No. 2022-114197.

A pattern forming apparatus (1) in Japanese Patent Application Publication No. 2022-114197 discharges ink onto an upper surface (9s) of a printed wiring board (9) and forms a pattern (image) of a resist film. The pattern forming apparatus (1) includes a head unit (3) and an ink supply unit (4) (see paragraphs [0026] to [0027]). The head unit (3) discharges fine droplets of ink toward the wiring board (9). The ink supply unit (4) supplies ink that is temporally stored in a first tank (41) to each discharge head (31) of the head unit (3) via a first passage portion (61) (see paragraphs [0029], [0036], and [0038]).

Meanwhile, the ink supply unit (4) includes a circulation unit (43) (see paragraph) [0036]). In ink supplied to each discharge head (31) of the head unit (3), a part thereof that is kept undischarged is collected in a second tank (65) via a second passage portion (63) (see paragraphs [0029], [0036], and [0046] to [0047]). The ink stored in the second tank (65) is hydraulically delivered to the first tank (41) by an operation of a first pump (673) (see paragraph [0048]). Further, the ink supply unit (4) includes a replenishment tank (68) and a replenishment passage portion (69). In the replenishment tank (68), new ink is stored, and this ink is hydraulically delivered to the second tank (65) via the replenishment passage portion (69) by an operation of the second pump (693). Thus, the circulation unit (43) is replenished with new ink as appropriate (see paragraphs [0050] to [0051]).

As described above, according to Japanese Patent Application Publication No. 2022-114197, new ink stored in the replenishment tank (68) is delivered to the second tank (65) by an operation of the second pump (693), and then is further delivered throughout the circulation unit (43) including the first tank (41) by an operation of the first pump (673). Specifically, new ink is delivered throughout the circulation unit (43) while being pressurized by a plurality of pumps (the second pump (693) and the first pump (673)) at least twice without fail. Thus, there is a fear that a dispersion film of particulate dispersions forming the ink may be broken down by great shear force applied to the particulate dispersions, to cause aggregation of the particulate dispersions. In such a case, the aggregation may probably cause clogging in the heads, a filter additionally provided in the circulation path, or the like.

SUMMARY OF THE INVENTION

The present invention has been made in view of the above-described situation, and it is an object to provide a technology that can prevent aggregation of ink by reducing shear force applied to the ink in a passage for supplying the ink to a head.

To solve the above-described problem, the first invention of the present application is directed to an inkjet printing apparatus that discharges ink onto a printing medium to perform printing, and includes a discharge head, a supply tank, a collecting tank, a connecting pipe, a circulation pump, a replenishment tank, a replenishment pipe, and a replenishment pump. The discharge head is configured to discharge ink from a nozzle. In the supply tank, ink supplied to the discharge head is stored. In the collecting tank, ink collected from the discharge head is stored. The connecting pipe connects an internal chamber of the supply tank and an internal chamber of the collecting tank such that the internal chambers communicate with each other. The circulation pump is interposed in the connecting pipe and is configured to perform a liquid-delivery operation of delivering ink from the collecting tank to the supply tank. In the replenishment tank, ink with which the supply tank is replenished is stored. The replenishment pipe connects an internal chamber of the replenishment tank and an internal passage of the connecting pipe such that the internal chamber and the internal passage communicate with each other. The replenishment pump is interposed in the replenishment pipe and is configured to perform a liquid-delivery operation of delivering ink from the replenishment tank to the connecting pipe. A connection point of the replenishment pipe and the connecting pipe is positioned between the circulation pump and the supply tank in the connecting pipe.

The second invention of the present application is directed to the inkjet printing apparatus according to the first invention, wherein the smallest passage diameter in the circulation pump is equal to or larger than the smallest passage diameter in the replenishment pump.

The third invention of the present application is directed to the inkjet printing apparatus according to the first invention or the second invention, wherein the circulation pump includes a circulation motor configured to pressurize ink therein and deliver the ink to the supply tank, the replenishment pump includes a replenishment motor configured to pressurize ink therein and deliver the ink to the connection point, the inkjet printing apparatus further includes a control unit configured to control driving of the circulation motor and the replenishment motor, the control unit performs circulation control in which the circulation motor is driven and performs replenishment control in which the replenishment motor is driven while the circulation motor is driven, and in the replenishment control, the replenishment motor has a driving period shorter than a driving period of the circulation motor.

The fourth invention of the present application is directed to the inkjet printing apparatus according to the third invention, wherein a flow amount of ink delivered from the circulation pump per unit time in the circulation control is larger than a flow amount of ink delivered from the replenishment pump per unit time in the circulation control.

The fifth invention of the present application is directed to the inkjet printing apparatus according to the third invention or the fourth invention, wherein a flow amount of ink delivered from the replenishment pump per unit time in the replenishment control is larger than a flow amount of ink delivered from the circulation pump per unit time in the replenishment control.

The sixth invention of the present application is directed to the inkjet printing apparatus according to any of the third to fifth inventions, which further includes: a first liquid-level sensor configured to detect that a liquid level of ink stored in the internal chamber of the supply tank is at a height of a first reference value, and output a first signal; and a second liquid-level sensor configured to detect that a liquid level of ink stored in the internal chamber of the supply tank is at a height of a second reference value higher than the first reference value, and output a second signal, wherein the control unit starts the replenishment control in response to the first signal output from the first liquid-level sensor, and stops the replenishment control in response to the second signal output from the second liquid-level sensor.

The seventh invention of the present application is directed to the inkjet printing apparatus according to any of the first to sixth inventions, which further includes a heater that is interposed in the connecting pipe and is configured to heat ink delivered through the internal passage of the connecting pipe, wherein the heater is positioned between the connection point and the supply tank in the connecting pipe.

The eighth invention of the present application is directed to the inkjet printing apparatus according to any of the first to seventh inventions, which further includes a deaeration unit that is interposed in the connecting pipe and is configured to remove bubbles in ink delivered through the internal passage of the connecting pipe, wherein the deaeration unit is positioned between the connection point and the supply tank in the connecting pipe.

The ninth invention of the present application is directed to the inkjet printing apparatus according to any of the first to eighth inventions, which further includes: a first filter that is interposed in the replenishment pipe and is configured to filter ink delivered through an internal passage of the replenishment pipe; and a second filter that is interposed in the connecting pipe and is configured to filter ink delivered through the internal passage of the connecting pipe, wherein the second filter is positioned between the connection point and the supply tank in the connecting pipe, and the first filter has a filtering diameter equal to or larger than a filtering diameter of the second filter.

According to the first to ninth inventions of the present application, ink delivered from the replenishment pump merges with ink delivered from the circulation pump at the connection point near the supply tank on the downstream side of the circulation pump, and is delivered to the supply tank. This can reduce the number of times ink passes through the pump, to thereby reduce shear force applied to the ink. Therefore, aggregation of ink can be prevented.

Further, according to the second invention of the present application, the smallest passage diameter in the circulation pump through which ink repeatedly passes is increased, so that shear force applied to ink can be further reduced.

Further, according to the third invention of the present application, in the replenishment pump that is expected to be less affected by shear force applied to ink because ink passes therethrough only once, the replenishment motor is driven at a high speed. This enables sufficient ink replenishment.

Further, according to the sixth invention of the present application, storage of a predetermined amount or more of ink in the internal chamber of the supply tank can be secured.

Further, according to the seventh invention of the present application, ink delivered from the circulation pump and ink merging into the connecting pipe via the replenishment pipe can be delivered to the supply tank after the temperatures thereof are adjusted.

Further, according to the eighth invention of the present application, ink delivered from the circulation pump and ink merging into the connecting pipe via the replenishment pipe can be delivered to the supply tank after being deaerated.

Further, according to the ninth invention of the present application, large impurities or the like in ink delivered from the replenishment pump can be removed in the replenishment pipe, and after that, small impurities or the like remaining in ink that merges with ink delivered from the circulation pump at the connection point can be further removed. Then, ink from which such impurities as described above have been removed can be delivered to the supply tank.

DESCRIPTION OF THE PREFERRED EMBODIMENTS

Figure 1:
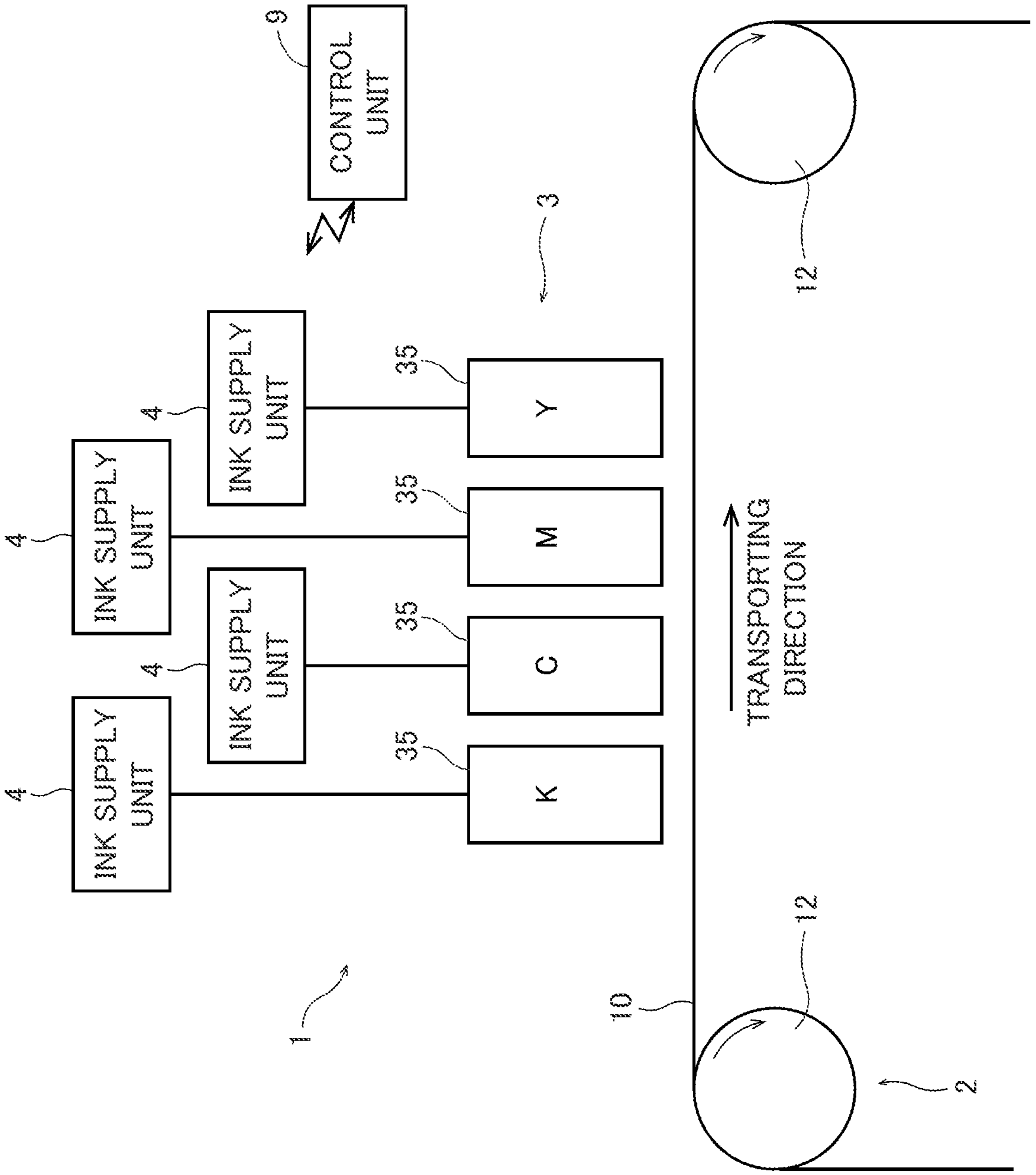
FIG. 1 is a view conceptually showing a configuration of an inkjet printing apparatus.

Hereinafter, a preferred embodiment of the present invention will be described with reference to the drawings. Note that components described in this preferred embodiment are mere examples and are not intended to limit the scope of the present invention to those only. In the drawings, for the purpose of easier understanding, the dimensions or the number of respective components are overstated or understated in some portions of illustration, as necessary.

1. Configuration of Inkjet Printing Apparatus

FIG. 1 is a view conceptually showing a configuration of an inkjet printing apparatus 1 according to one preferred embodiment of the present invention. The inkjet printing apparatus 1 is an inkjet printing machine that discharges droplets of water-based ink toward continuous paper 10 in a shape of a long strip from a plurality of discharge heads 35 while transporting the continuous paper 10, to record characters or images on a surface of the continuous paper 10. Meanwhile, the continuous paper 10 in a shape of a long strip is simply one example of a printing medium. The printing medium may be a cut sheet, a plastic film, a cardboard, metal foil, a material made of glass, or the like. In other words, the inkjet printing apparatus 1 may be any apparatus that can discharge ink toward a printing medium, to perform printing. As shown in FIG. 1, the inkjet printing apparatus 1 includes a transport unit 2, a printing unit 3, and a control unit 9.

The transport unit 2 is a mechanism configured to transport the continuous paper 10 along a predetermined transporting path in a transporting direction extending along the lengthwise direction of the continuous paper 10. The continuous paper 10 is stretched over a plurality of transport rollers 12. The continuous paper 10 is transported along a transporting path formed by the plurality of transport rollers 12. Each of the transport rollers 12 rotates about an axis extending in a direction perpendicular to the transporting direction, to thereby guide the continuous paper 10 to a downstream side in the transporting path. Further, the continuous paper 10 is under tension in the transporting direction. This reduces slack or wrinkles in the continuous paper 10 during transporting.

The printing unit 3 includes a plurality of discharge heads 35 and a plurality of ink supply units 4. In the present preferred embodiment, four discharge units 35 and four ink supply units 4 are included. The four discharge heads 35 have substantially the same configuration with each other. Further, the four ink supply units 4 have substantially the same configuration with each other.

The four discharge heads 35 are arranged while being spaced from each other along the transporting direction. Each of the four discharge heads 35 discharges ink droplets toward a surface (upper surface) of the continuous paper 10 from nozzles 83 (refer to FIG. 2 described later). In the present preferred embodiment, the four discharge heads 35 discharge ink in different colors, respectively, to thereby each record a monochromatic image on the surface (upper surface) of the continuous paper 10. For example, the four discharge heads 35 discharge cyan ink, magenta ink, yellow ink, and black ink, respectively, to thereby each record a monochromatic image on the surface (upper surface) of the continuous paper 10. Then, the four monochromatic images are superimposed, so that a multicolor image is formed on the upper surface of the continuous paper 10.

Figure 2:
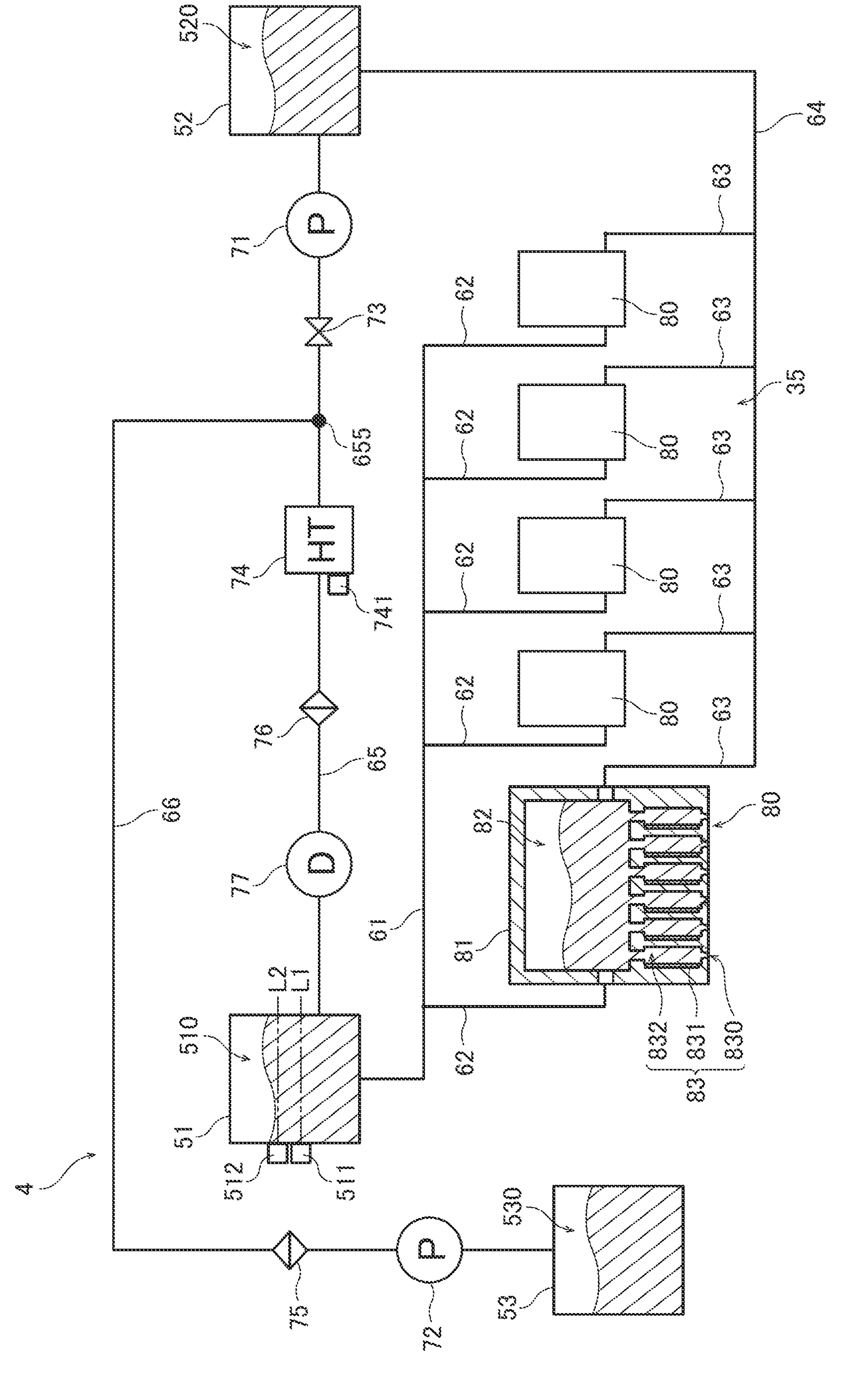
FIG. 2 is a view conceptually showing configurations of an ink supply unit and a discharge head.

FIG. 2 is a view conceptually showing a configuration of one ink supply unit 4 and a configuration of one discharge head 35. In the present preferred embodiment, each of the discharge heads 35 includes a plurality of heads 80. In the present preferred embodiment, each of the discharge heads 35 includes five heads 80. The five heads 80 have substantially the same configuration with each other. Hence, in FIG. 2, only one of the five heads 80 is shown in detail, and the other four heads 80 are shown in a simplified manner. As shown in FIG. 2, each of the five heads 80 includes a casing 81, an internal tank 82, and a plurality of nozzles 83.

The casing 81 forms an outer frame of the head 80. The internal tank 82 is provided in the casing 81, and ink can be temporarily stored there. The plurality of nozzles 83 are arranged while being equally spaced from each other along the transporting direction and a widthwise direction of the continuous paper 10 in the lower portion of the casing 81. Each of the plurality of nozzles 83 communicates with the internal tank 82. Further, each of the plurality of nozzles 83 includes a plurality of piezoelectric elements 831 serving as pressure generation elements, an ink chamber 832, and a discharge port 830. The ink chamber 832 communicates with the internal tank 82.

During discharge of ink, ink flows down from the internal tank 82 to the ink chamber 832. Then, under the control of the piezoelectric elements 831, ink in the ink chamber 832 is pressurized, and thus is discharged in the form of liquid droplets from the discharge port 830. Alternatively, the nozzle 83 may be one adapted to a so-called thermal method in which ink in the ink chamber 832 is heated to generate bubbles and thus is pressurized.

Next, the ink supply unit 4 is described. The ink supply unit 4 is a device configured to circulate a part of ink while supplying ink to the discharge head 35. As described above, the inkjet printing apparatus 1 of the present preferred embodiment includes four ink supply units 4. The four ink supply units 4 have substantially the same configuration with each other, and hence only a configuration of one ink supply unit 4 is described below.

As shown in FIG. 2, each of the ink supply units 4 includes a supply tank 51, a collecting tank 52, a replenishment tank 53, a supply-side manifold 61, and a plurality of supply-side branch pipes 62, a plurality of collecting-side branch pipes 63, a collecting-side manifold 64, a connecting pipe 65, a replenishment pipe 66, a circulation pump 71, a replenishment pump 72, a backflow prevention on-off valve 73, a heater 74, a first filter 75, a second filter 76, and a deaeration unit 77. In the present preferred embodiment, each of the ink supply units 4 includes five supply-side branch pipes 62 and five collecting-side branch pipes 63.

The supply tank 51 is a container for temporally storing ink to be supplied to the discharge head 35. In the supply tank 51, an internal chamber 510 in which ink can be temporally stored is provided. Further, in the supply tank 51, a first liquid-level sensor 511 and a second liquid-level sensor 512 are mounted.

Each of the first liquid-level sensor 511 and the second liquid-level sensor 512 is electrically connected to the control unit 9. When detecting that the liquid level of ink stored in the internal chamber 510 of the supply tank 51 is at the height of a first reference value L1, the first liquid-level sensor 511 outputs a first signal to the control unit 9 via a communication circuit not shown. When detecting that the liquid level of ink stored in the internal chamber 510 of the supply tank 51 is at the height of a second reference value L2, the second liquid-level sensor 512 outputs a second signal to the control unit 9 via the communication circuit not shown. Note that the second reference value L2 is higher than the first reference value L1.

Figure 3:
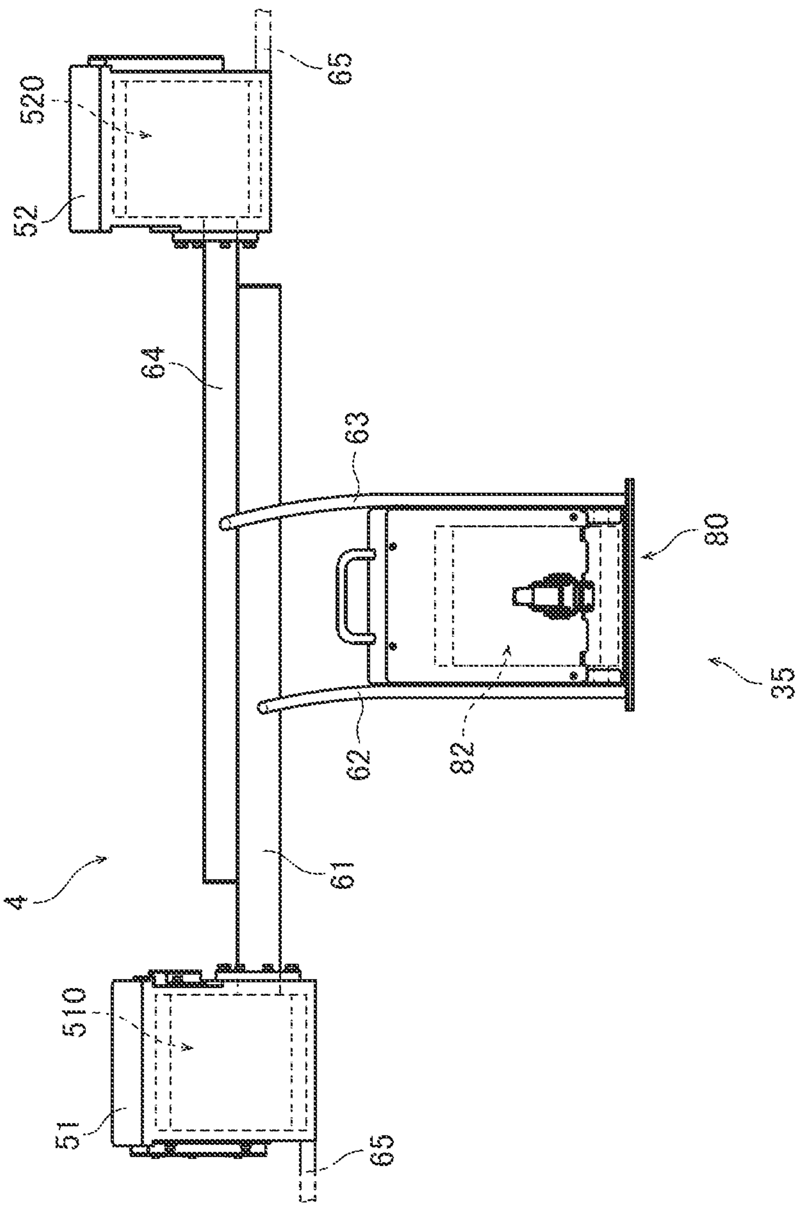
FIG. 3 is a partial perspective view of the discharge head and the ink supply unit.

The supply-side manifold 61 and the five supply-side branch pipes 62 are pipes connecting the supply tank 51 and the five heads 80 included in one discharge head 35. FIG. 3 is a partial perspective view of the discharge head 35 and the ink supply unit 4. Note that, for the purpose of easier understanding, FIG. 3 shows only one of the five heads 80 included in the discharge head 35, only one of the five supply-side branch pipes 62 connected to the supply-side manifold 61, and only one of the five collecting-side branch pipes 63 connected to the collecting-side manifold 64.

As shown in FIGS. 2 and 3, the supply-side manifold 61 is a wide pipe of which upstream end is connected so as to communicate with the internal chamber 510 of the supply tank 51. Each of the five supply-side branch pipes 62 is a narrow pipe that branches off from the supply-side manifold 61. Each of the five supply-side branch pipes 62 has an upstream end that communicates with an internal passage of the supply-side manifold 61, and has a downstream end that is connected so as to communicate with the internal tank 82 of one head 80. Note that an on-off valve, a filter, or the like may be additionally interposed in the supply-side manifold 61 or the five supply-side branch pipes 62.

The five collecting-side branch pipes 63 and the collecting-side manifold 64 are pipes connecting the five heads 80 included in one discharge head 35 and the collecting tank 52.

As shown in FIGS. 2 and 3, each of the five collecting-side branch pipes 63 is a narrow pipe that branches off from the collecting-side manifold 64. Each of the five collecting-side branch pipes 63 has an upstream end that is connected so as to communicate with the internal tank 82 of one head 80, and has a downstream end that is connected so as to communicate with an internal passage of the collecting-side manifold 64. The collecting-side manifold 64 is a wide pipe of which downstream end is connected so as to communicate with the internal chamber 520 of the collecting tank 52 described later. Note that an on-off valve, a filter, or the like may be additionally interposed in the five collecting-side branch pipes 63 and the collecting-side manifold 64.

The collecting tank 52 is a container for temporally storing ink collected from the discharge head 35. In the collecting tank 52, the internal chamber 520 in which ink can be temporally stored is provided.

Note that the supply tank 51 and the collecting tank 52 are connected to a pressure-difference generation unit not shown. The pressure-difference generation unit adjusts the pressure of the internal chamber 510 of the supply tank 51 and the pressure of the internal chamber 520 of the collecting tank 52, to generate a pressure difference between the internal chamber 510 of the supply tank 51 and the internal chamber 520 of the collecting tank 52. More specifically, the pressure-difference generation unit adjusts the pressures so that the internal chamber 510 of the supply tank 51 has a positive pressure and the internal chamber 520 of the collecting tank 52 has a negative pressure.

Thus, there is formed a part of an ink circulation path, extending from the supply tank 51 to the collecting tank 52 via the supply-side manifold 61, the supply-side branch pipes 62, the internal tanks 82 of the heads 80, the collecting-side branch pipes 63, and the collecting-side manifold 64. As a result of this, ink stored in the supply tank 51 can be supplied to the discharge heads 35, and further, ink remaining in the discharge heads 35 can be collected in the collecting tank 52. Note that the ink remaining in the discharge heads 35 is ink that is kept undischarged from the discharge heads 35.

The connecting pipe 65 is a pipe that connects the internal chamber 510 of the supply tank 51 and the internal chamber 520 of the collecting tank 52 such that the respective internal chambers can communicate with each other. As shown in FIG. 2, the internal passage of the connecting pipe 65 has an upstream end that is connected so as to communicate with the internal chamber 520 of the collecting tank 52. Meanwhile, the internal passage of the connecting pipe 65 has a downstream end that is connected so as to communicate with the internal chamber 510 of the supply tank 51. In the connecting pipe 65, the circulation pump 71, the backflow prevention on-off valve 73, the heater 74, the second filter 76, and the deaeration unit 77 are interposed. Note that a connection point 655, which is between the backflow prevention on-off valve 73 and the heater 74, and which is on the ink circulation path in the connecting pipe 65, is connected to the replenishment pipe 66, details of which will be given later.

Figure 4:
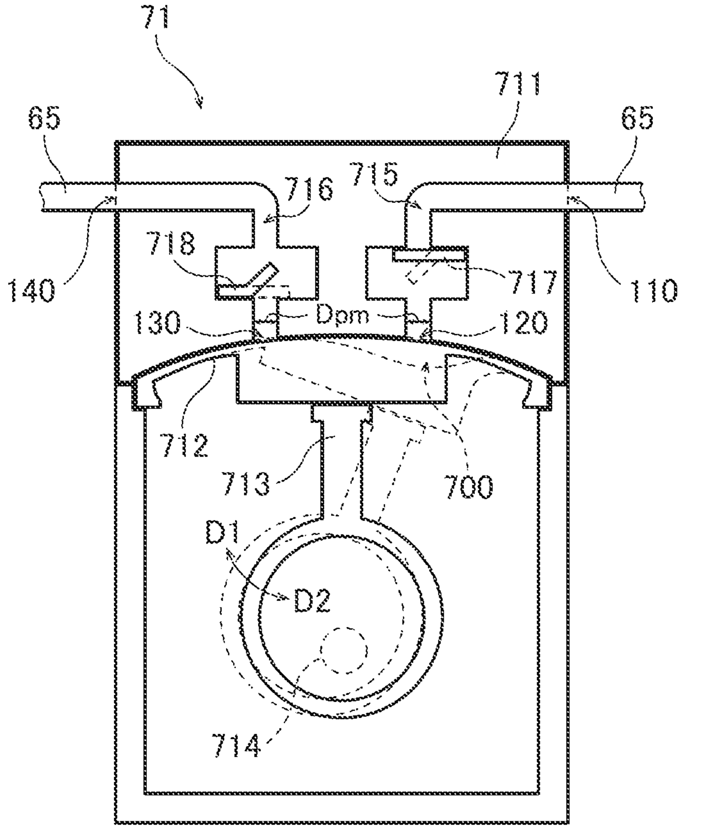
FIG. 4 is a longitudinal sectional view conceptually showing a circulation pump.

The circulation pump 71 is a device configured to perform a liquid-delivery operation of delivering ink from the collecting tank 52 to the supply tank 51. The circulation pump 71 generates flow of ink from the collecting tank 52 to the supply tank 51 in the internal passage of the connecting pipe 65. FIG. 4 is a longitudinal sectional view conceptually showing the circulation pump 71. Note that, for the purpose of easier understanding, hatching is omitted in FIG. 4. For the circulation pump 71 of the present preferred embodiment, for example, a pump in which foreign matters such as dust are unlikely to be generated during driving, such as a diaphragm pump, is used. As shown in FIG. 4, the circulation pump 71 includes a pump head 711, a diaphragm 712, a piston 713, and a circulation motor 714.

In the pump head 711, a flow-in passage 715 and a flow-out passage 716 are formed. Each of the flow-in passage 715 and the flow-out passage 716 penetrates through the pump head 711. The flow-in passage 715 penetrates from an inlet 110 of the circulation pump 71 to a flow-in-side opening 120 formed in a surface of the pump head 711 in contact with the diaphragm 712. The flow-out passage 716 penetrates from a flow-out-side opening 130 formed in a surface of the pump head 711 in contact with the diaphragm 712 to an outlet 140 of the circulation pump 71. Further, the flow-in passage 715 is provided with a flow-in passage on-off valve 717 that can interrupt penetration of the flow-in passage 715. The flow-out passage 716 is provided with a flow-out passage on-off valve 718 that can interrupt penetration of the flow-out passage 716.

The diaphragm 712 is made of a material such as synthetic resin and has flexibility. The diaphragm 712 of the present preferred embodiment is a rolling diaphragm. The diaphragm 712 is fixed to the pump head 711 at an edge portion thereof. Thus, the flow-in-side opening 120 and the flow-out-side opening 130 of the pump head 711 are closed. As a result of this, a space 700 is formed between the pump head 711 and the diaphragm 712.

The piston 713 and the circulation motor 714 are provided on the side of the diaphragm 712 opposite to the side facing the pump head 711. The piston 713 is fixed to the diaphragm 712 at one end thereof and is connected to the circulation motor 714 at the other end. For the circulation motor 714, for example, a stepping motor is used. When the circulation motor 714 forwardly rotates or reversely rotates, the piston 713 reciprocates as indicated by an arrow in FIG. 4. A period in which the piston 713 reciprocates once is equal to a period in which the circulation motor 714 reciprocally turns once, which will be described later.

As shown in FIG. 4, when the piston 713 moves in a D1 direction, the diaphragm 712 fixed to the piston 713 deforms such that the central portion thereof is separated from the pump head 711. This increases the volume of the space 700 between the pump head 711 and the diaphragm 712. Further, at that time, the flow-in passage on-off valve 717 is opened while the flow-out passage on-off valve 718 is closed. As a result of this, ink stored in the collecting tank 52 enters into the circulation pump 71 from the inlet 110 via the connecting pipe 65, and flows into the space 700 via the flow-in passage 715 and the flow-in-side opening 120.

On the other hand, when the piston 713 moves in a D2 direction opposite to the D1 direction, the diaphragm 712 fixed to the piston 713 deforms such that the central portion thereof comes into contact with the pump head 711. This reduces the volume of the space 700 between the pump head 711 and the diaphragm 712. Further, at that time, the flow-in passage on-off valve 717 is closed while the flow-out passage on-off valve 718 is opened. As a result of this, ink present in the space 700 flows through the flow-out-side opening 130 and the flow-out passage 716, and is delivered from the outlet 140 of the circulation pump 71 toward the supply tank 51.

As described above, by driving the circulation motor 714, it is possible to deliver ink in the circulation pump 71 toward the supply tank 51 while pressurizing the ink. Note that, for the circulation pump 71 of the present preferred embodiment, a pump having a lager capacity than that of the replenishment pump 72 described later is used. Specifically, each of the diameter of the flow-in passage 715, the diameter of the flow-out passage 716, and the capacity of the space 700 in the circulation pump 71 of the present preferred embodiment is larger than that in the replenishment pump 72 described later. The diameter of the narrowest portion of each of the flow-in passage 715 and the flow-out passage 716 of the present preferred embodiment is approximately 4 to 5 mm. In other words, the smallest passage diameter Dpm in the circulation pump 71 is approximately 4 to 5 mm.

The description refers back to FIG. 2. The backflow prevention on-off valve 73 is interposed on the downstream side of the circulation pump 71 and on the upstream side of the connection point 655 in the connecting pipe 65. When the backflow prevention on-off valve 73 is closed, penetration through the internal passage of the connecting pipe 65 is interrupted. That is, when the backflow prevention on-off valve 73 is closed, backflow of ink flowing from the vicinity of the connection point 655 toward the circulation pump 71 is prevented. On the other hand, when the backflow prevention on-off valve 73 is opened, penetration through the internal passage of the connecting pipe 65 is secured.

The heater 74 is a device configured to heat ink delivered through the internal passage of the connecting pipe 65. The heater 74 is positioned between the connection point 655 and the supply tank 51 in the connecting pipe 65. Further, a temperature sensor 741 is mounted in the heater 74. The temperature sensor 741 measures the temperature of ink flowing into the heater 74. Further, the temperature sensor 741 is electrically connected to the control unit 9. The temperature sensor 741 outputs data regarding a result of measurement of the temperature of ink, to the control unit 9.

The second filter 76 is interposed on the downstream side of the heater 74 and on the upstream side of the deaeration unit 77 in the connecting pipe 65. In other words, the second filter 76 is positioned between the connection point 655 and the supply tank 51 in the connecting pipe 65. The second filter 76 filters ink delivered through the internal passage of the connecting pipe 65, to remove foreign matters included in the ink. The second filter 76 of the present preferred embodiment has a filtering diameter of approximately 4 to 6 μm, and, for example, has a filtering diameter of approximately 5 μm. Note that the filtering diameter of the second filter 76 indicates the mesh size of the second filter 76.

The deaeration unit 77 is interposed on the downstream side of the second filter 76 and on the upstream side of the supply tank 51 in the connecting pipe 65. In other words, the deaeration unit 77 is positioned between the connection point 655 and the supply tank 51 in the connecting pipe 65. The deaeration unit 77 of the present preferred embodiment is a so-called hollow-fiber membrane deaeration module. The deaeration unit 77 removes bubbles in ink delivered through the internal passage of the connecting pipe 65.

The replenishment tank 53 is a container for storing ink with which the supply tank 51 is to be replenished. In the replenishment tank 53, the internal chamber 530 in which ink can be stored is provided. In the internal chamber 530 of the replenishment tank 53, a sufficient amount of ink is constantly stored. The replenishment tank 53 is provided outside of the above-described circulation path of ink circulating between the supply tank 51 and the collecting tank 52.

The replenishment pipe 66 is a pipe that connects the internal chamber 530 of the replenishment tank 53 and the internal passage of the connecting pipe 65 such that they can communicate with each other. As shown in FIG. 2, the internal passage of the replenishment pipe 66 is connected so as to communicate with the internal chamber 530 of the replenishment tank 53 at the upstream end thereof. Further, the internal passage of the replenishment pipe 66 is connected so as to communicate with the internal passage of the connecting pipe 65 at the connection point 655 at the downstream end thereof. The connection point 655 of the replenishment pipe 66 and the connecting pipe 65 is positioned between the circulation pump 71 and the supply tank 51 in the connecting pipe 65. In the present preferred embodiment, the connection point 655 is positioned between the backflow prevention on-off valve 73 and the supply tank 51 in the connecting pipe 65. Further, in the replenishment pipe 66, the replenishment pump 72 and the first filter 75 are interposed.

The replenishment pump 72 is a device configured to perform a liquid-delivery operation of delivering ink from the replenishment tank 53 to the connecting pipe 65. For the replenishment pump 72 of the present preferred embodiment, a pump having the same type of configuration as the circulation pump 71 is used. For example, a diaphragm pump is used for the replenishment pump 72. The replenishment pump 72 includes a replenishment motor 724 having the same type of configuration as the circulation motor 714. By driving of the replenishment motor 724, the replenishment pump 72 can deliver ink in the replenishment pump 72 toward the connection point 655 while pressurizing the ink.

In the meantime, for the replenishment pump 72 of the present preferred embodiment, a pump having a smaller capacity than that of the circulation pump 71 is used. The diameter of the narrowest portion in a flow-in passage and a flow-out passage of the replenishment pump 72 of the present preferred embodiment is approximately 2 to 4 mm, and, for example, is approximately 3 mm. In other words, the smallest passage diameter Dps in the replenishment pump 72 is approximately 2 to 4 mm, and is, for example, approximately 3 mm. That is, the smallest passage diameter Dpm in the circulation pump 71 is equal to or larger than the smallest passage diameter Dps in the replenishment pump 72.

The first filter 75 is interposed on the downstream side of the replenishment pump 72 and on the upstream side of the connection point 655 in an ink replenishment path of the replenishment pipe 66. In other words, the first filter 75 is positioned between the replenishment pump 72 and the connection point 655 in the replenishment pipe 66. The first filter 75 filters ink delivered through the internal passage of the replenishment pipe 66, to remove foreign matters included in the ink. Note that the first filter 75 of the present preferred embodiment has a filtering diameter of approximately 10 to 30 μm, and, for example, has a filtering diameter of approximately 20 μm. Note that the filtering diameter of the first filter 75 indicates the mesh size of the first filter 75. That is, in the present preferred embodiment, the filtering diameter of the first filter 75 is equal to or larger than the filtering diameter of the second filter 76.

Figure 5:
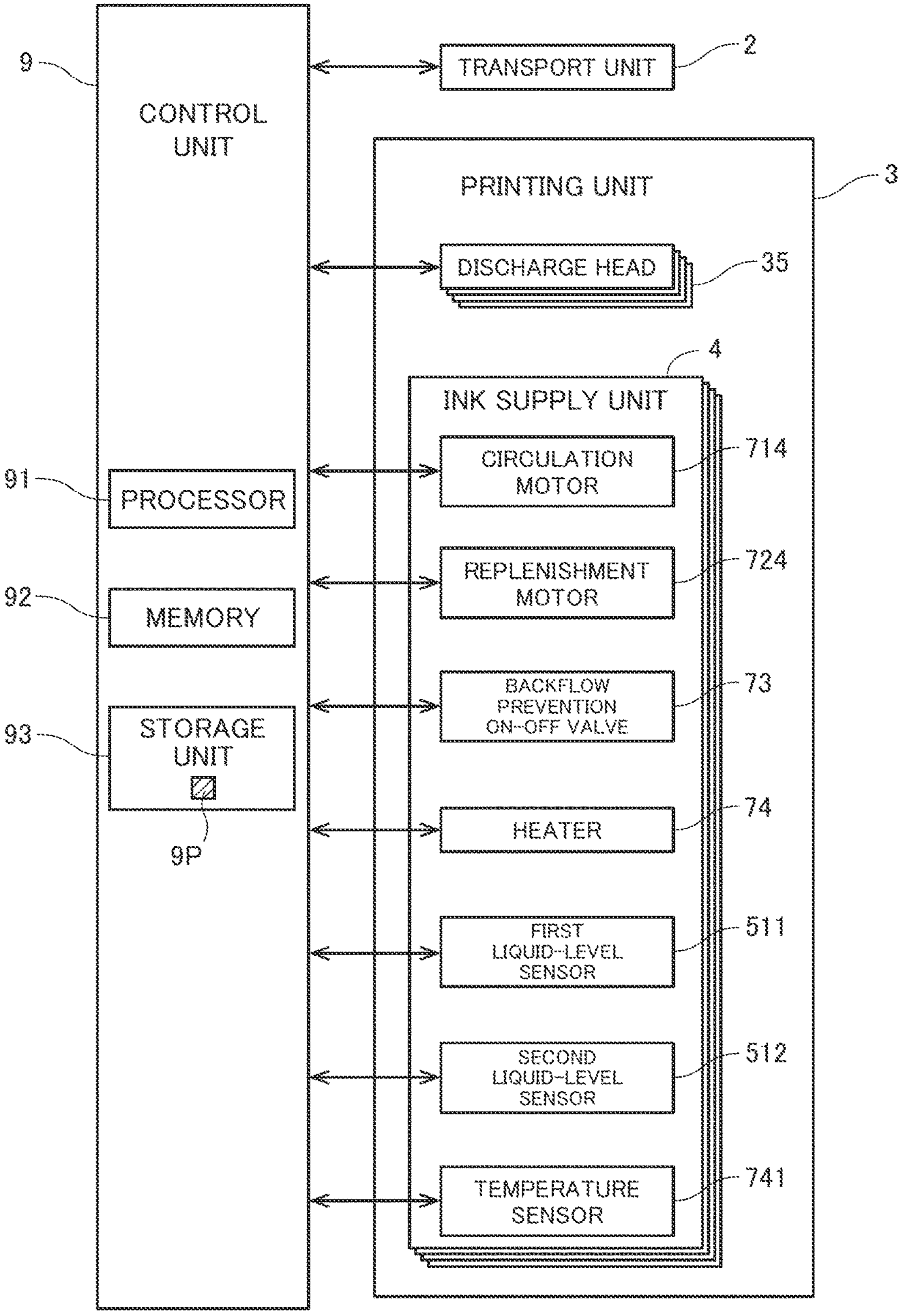
FIG. 5 is a block diagram showing connections between a control unit and respective components of the inkjet printing apparatus.

Next, the control unit 9 is described. The control unit 9 is an information processing device configured to control the respective components of the inkjet printing apparatus 1. FIG. 5 is a block diagram showing connections between the control unit 9 and the respective components of the inkjet printing apparatus 1. As conceptually shown in FIG. 5, the control unit 9 includes a processor 91 such as a CPU, a memory 92 such as a RAM, and a storage unit 93 such as a hard disk drive. In the storage unit 93, a computer program 9P for performing a printing operation while transporting the continuous paper 10 and further supplying ink to the discharge head 35 is stored.

Further, as shown in FIG. 5, the control unit 9 is connected to the transport unit 2 and the four discharge heads 35 of the printing unit 3, and is further connected to the circulation motor 714, the replenishment motor 724, the backflow prevention on-off valve 73, the heater 74, the first liquid-level sensor 511, the second liquid-level sensor 512, and the temperature sensor 741 of each of the four ink supply units 4 of the printing unit 3 such that the control unit 9 can conduct communication with the above-described components. The control unit 9 controls operations of those components in accordance with the computer program 9P. The control unit 9 controls driving of the circulation motor 714 and the replenishment motor 724 of the ink supply unit 4. Thus, a process of transporting the continuous paper 10 and performing printing thereon proceeds, and ink is supplied to the internal tank 82 of each of the discharge heads 35.

2. Overview of Printing Process and Procedure for Ink Supply

Figure 6:
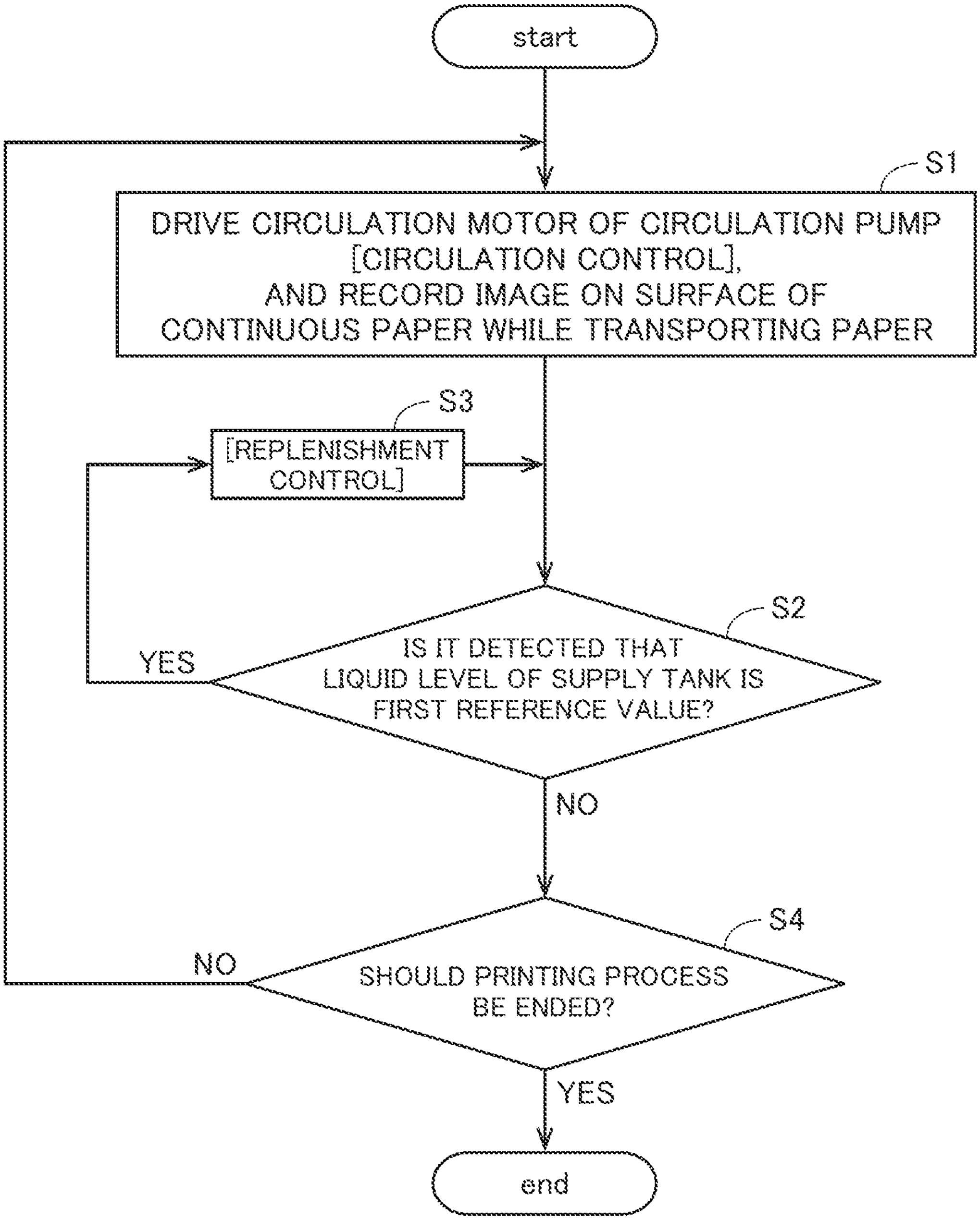
FIG. 6 is a flowchart showing a flow of a transporting and printing process and a procedure for supplying ink to the discharge head.

Next, overview of a process of transporting the continuous paper 10 and performing printing thereon that is performed in the inkjet printing apparatus 1, and a procedure for supply of ink to the internal tank 82 of each of the discharge heads 35, are described. FIG. 6 is a flowchart showing a flow of a process of transporting the continuous paper 10 and performing printing thereon and a procedure for supply of ink to the internal tank 82 of each of the discharge heads 35.

In performing the process of transporting the continuous paper 10 and performing printing thereon, as shown in FIG. 6, the control unit 9 controls the plurality of nozzles 83 of each of the four discharge heads 35 such that ink droplets are discharged onto the surface of the continuous paper 10, to thereby record an image on the surface of the continuous paper 10, while transporting the continuous paper 10 along a predetermined transporting path in the lengthwise direction by causing the transport unit 2 to operate. Note that, as advance preparation for the process of transporting the continuous paper 10 and performing printing thereon, ink is stored in the supply tank 51 until the height of the liquid level of the ink becomes equal to or larger than the first reference value L1 at the lowest. In the present preferred embodiment, as advance preparation for the process of transporting the continuous paper 10 and performing printing thereon, ink is stored in the supply tank 51 until the height of the liquid level of the ink becomes equal to or larger than the second reference value L2. Further, as described above, a sufficient amount of ink is constantly stored in the internal chamber 530 of the replenishment tank 53. Meanwhile, the backflow prevention on-off valve 73 is opened.

Further, as advance preparation for the process of transporting the continuous paper 10 and performing printing thereon, the control unit 9 drives the circulation pump 71, the heater 74, and the deaeration unit 77 of each of the four ink supply units 4. Specifically, the control unit 9 drives the circulation motor 714, to perform “circulation control” in which ink is supplied to the internal tank 82 of each of the discharge heads 35 while the ink is circulated in the above-described ink circulation path (step S1). Moreover, the power of the first liquid-level sensor 511, the second liquid-level sensor 512, and the temperature sensor 741 is turned on, and then those sensors start measuring.

By driving of the circulation pump 71, flow of ink from the collecting tank 52 to the supply tank 51 is generated in the internal passage of the connecting pipe 65. Here, as described above, a large-capacity pump is used for the circulation pump 71 of the present preferred embodiment. The smallest passage diameter Dpm in the circulation pump 71 is approximately 4 to 5 mm. Meanwhile, the circulation motor 714 is controlled such that it turns at a low speed. The circulation motor 714 is controlled such that it reciprocally turns approximately 200 to 400 times per minute. In the present preferred embodiment, the circulation motor 714 is controlled such that it reciprocally turns approximately 300 times per minute, for example. This reduces shear force applied to particulate dispersions forming ink passing through the circulation pump 71. As a result of this, the particulate dispersions are prevented from being aggregated due to breakdown of a dispersion film of the particulate dispersions by shear force. Consequently, the nozzles 83 of the discharge heads 35, the second filter 76, and the like are prevented from being clogged due to aggregation of the particulate dispersions. That is, by increasing the smallest passage diameter Dpm in the circulation pump 71 through which ink repeatedly passes and by driving the circulation motor 714 at a low speed, it is possible to reduce shear force applied to ink, to thereby prevent aggregation of ink.

Further, by driving of the heater 74, ink passing through the internal passage of the connecting pipe 65 can be delivered to the supply tank 51 after the temperature thereof is adjusted. More specifically, the control unit 9 adjusts an amount of driving of the heater 74 on the basis of a result of measurement of ink temperature input from the temperature sensor 741. Thus, ink passing through the heater 74 can be delivered to the supply tank 51 after the temperature thereof is adjusted to the most appropriate temperature.

Moreover, by causing ink passing through the internal passage of the connecting pipe 65 to pass through the second filter 76, it is possible to remove small impurities remaining in ink and then deliver the ink to the supply tank 51. Furthermore, by driving the deaeration unit 77, it is possible to deliver ink passing through the internal passage of the connecting pipe 65 to the supply tank 51 after deaerating the ink.

After the printing process is performed, in which ink droplets are discharged onto the surface of the continuous paper 10 from each of the discharge heads 35, the amount of ink stored in the supply tank 51 decreases. Then, when detecting that the liquid level of ink stored in the internal chamber 510 of the supply tank 51 is at the height of the first reference value L1, the first liquid-level sensor 511 outputs the first signal to the control unit 9. In other words, when detecting that the height of the liquid level of ink stored in the supply tank 51 decreases to the first reference value L1, the first liquid-level sensor 511 outputs the first signal to the control unit 9. The control unit 9 checks whether or not the first signal has been output from the first liquid-level sensor 511 (step S2). The control unit 9 continues performing the circulation control until the first signal is output from the first liquid-level sensor 511 (step S2: NO).

When the first signal is output from the first liquid-level sensor 511 (step S2: YES), the control unit 9 further drives the replenishment pump 72. Specifically, the control unit 9 further drives the replenishment motor 724 while driving the circulation motor 714. Thus, the control unit 9 performs “replenishment control” in which the above-described ink circulation path is replenished with ink while ink is circulated in the ink circulation path (step S3). The control unit 9 starts the replenishment control in response to the first signal output from the first liquid-level sensor 511. Note that, in the present preferred embodiment, the backflow prevention on-off valve 73 is opened also during the replenishment control. Also in the replenishment control, flow of ink from the circulation pump 71 to the supply tank 51 is generated, and thus backflow of ink from the vicinity of the connection point 655 to the circulation pump 71 is prevented. Alternatively, the backflow prevention on-off valve 73 may be closed during the replenishment control. This can reduce a back pressure applied to the circulation pump 71.

By driving of the replenishment pump 72, flow of ink from the replenishment tank 53 to the connection point 655 is generated in the internal passage of the replenishment pipe 66. Here, as described above, a small-capacity pump is used for the replenishment pump 72 of the present preferred embodiment. The smallest passage diameter Dps in the replenishment pump 72 is approximately 2 to 4 mm, and is, for example, approximately 3 mm. Meanwhile, the replenishment motor 724 is controlled such that it turns at a high speed. The replenishment motor 724 is controlled such that it reciprocally turns approximately 3000 to 4000 times per minute. In the present preferred embodiment, the replenishment motor 724 is controlled such that it reciprocally turns approximately 3300 times per minute, for example. That is, in the replenishment control, the speed of reciprocal turning of the replenishment motor 724 is higher than the speed of reciprocal turning of the circulation motor 714. In other words, in the replenishment control, the replenishment motor 724 has a driving period shorter than a driving period of the circulation motor 714. This allows even the replenishment pump 72 with a small capacity to achieve sufficient ink replenishment. Consequently, storage of a predetermined amount or more of ink in the internal chamber 510 of the supply tank 51 can be secured.

Meanwhile, in the replenishment pump 72, ink passes through a narrow passage of which smallest passage diameter Dps is approximately 3 mm, at a high speed. Thus, in the replenishment pump 72, relatively large shear force is applied to the particulate dispersions forming the ink. However, in the present invention, ink passes through the replenishment pump 72 only once. Hence, the influence of the shear force is smaller than that in a case in which ink repeatedly passes through a narrow passage at a high speed. Consequently, the nozzles 83 of the discharge heads 35, the second filter 76, and the like are prevented from being clogged due to aggregation of the particulate dispersions caused by breakdown of the dispersion film due to shear force is repeatedly applied to the particulate dispersions. That is, in the present invention, in the replenishment pump 72 that is expected to be less affected by shear force applied to ink because the ink passes therethrough only once, the replenishment motor 724 is driven at a high speed. This enables sufficient ink replenishment. Further, to use a small-capacity pump for the replenishment pump 72 can lead to cost reduction.

The ink delivered from the replenishment pump 72 passes through the first filter 75. After that, the ink reaches the connection point 655 of the replenishment pipe 66 and the connecting pipe 65, merges with the ink delivered from the circulation pump 71, and then flows toward to the supply tank 51 while passing through the second filter 76. Here, in the present preferred embodiment, the first filter 75 has a filtering diameter equal to or larger than a filtering diameter of the second filter 76. Thus, large impurities or the like in ink that is provided immediately after being delivered from the replenishment pump 72 can be removed by the first filter 75, and further, small impurities or the like remaining in ink that is provided after merging with the ink delivered from the circulation pump 71 can be removed by the second filter 76. Then, ink from which such impurities as described above have been removed can be delivered to the supply tank 51.

Further, after the ink delivered from the replenishment pump 72 and the ink delivered from the circulation pump 71 merge with each other, ink flowing through the internal passage of the connecting pipe 65 is caused to pass through the heater 74. Thus, the ink can be delivered to the supply tank 51 after the temperature thereof is adjusted to the most appropriate temperature. Moreover, after the ink delivered from the replenishment pump 72 and the ink delivered from the circulation pump 71 merge with each other, ink flowing through the internal passage of the connecting pipe 65 is caused to pass through the deaeration unit 77. Thus, the ink can be delivered to the supply tank 51 after being deaerated.

After the replenishment control is performed, the amount of ink stored in the supply tank 51 increases. Then, when detecting that the liquid level of the ink stored in the internal chamber 510 of the supply tank 51 is at the height of the second reference value L2, the second liquid-level sensor 512 outputs the second signal to the control unit 9. Specifically, when detecting that the height of the liquid level of ink stored in the supply tank 51 increases to the second reference value L2, the second liquid-level sensor 512 outputs the second signal to the control unit 9. The control unit 9 checks whether or not the second signal has been output from the second liquid-level sensor 512. When the second signal is output from the second liquid-level sensor 512, the control unit 9 ends the replenishment control and performs the circulation control again.

After that, the control unit 9 determines whether to end the process of transporting the continuous paper 10 and performing printing thereon (step S4). In a case in which there remains image data to be printed, the control unit 9 continues the process of transporting the continuous paper 10 and performing printing thereon (step S4: NO). In this case, the control unit 9 performs again the above-described processes of the steps S1 to S3. In this manner, the control unit 9 repeats the processes of the steps S1 to S3, to thereby proceed with a printing process while transporting the continuous paper 10 and keeping a predetermined amount or more of ink stored in the internal chamber 510 of the supply tank 51.

After a while, when there is no image data to be printed, the control unit 9 stops the operations of the respective components including the ink supply unit 4, and ends the process of transporting the continuous paper 10 and performing printing thereon and ink supply to the discharge heads 35 (step S4: YES).

As described above, in the inkjet printing apparatus 1, in supplying ink to the internal tank 82 of each of the discharge heads 35 while circulating a part of the ink, the control unit 9 performs circulation control in which the circulation pump 71 is mainly driven and replenishment control in which the replenishment pump 72 is mainly driven. In the circulation control, only the circulation pump 71 is driven and the replenishment pump 72 is not driven. That is, a flow amount of ink delivered from the circulation pump 71 per unit time in the circulation control is larger than a flow amount of ink delivered from the replenishment pump 72 per unit time in the circulation control. On the other hand, in the replenishment control, the replenishment motor 724 of the replenishment pump 72 is driven at a high speed. A flow amount of ink delivered from the replenishment pump 72 per unit time in the replenishment control is larger than a flow amount of ink delivered from the circulation pump 71 per unit time in the replenishment control.

Further, the ink delivered from the replenishment pump 72 merges with the ink delivered from the circulation pump 71 at the connection point 655 near the supply tank 51 on the downstream side of the circulation pump 71, and then is delivered to the supply tank 51. This can reduce the number of times ink passes through the circulation pump 71 and the replenishment pump 72, to reduce shear force applied to the ink. Therefore, aggregation of the ink can be prevented.

3. Modifications

Hereinabove, one preferred embodiment of the present invention has been described, but the present invention is not limited to the above-described preferred embodiment.

In the above-described preferred embodiment, in performing replenishment control, while the circulation pump 71 is driven, the replenishment pump 72 is further driven. Alternatively, in performing replenishment control, driving of the circulation pump 71 may be stopped, and only the replenishment pump 72 may be driven. In this case, it is desirable to close the backflow prevention on-off valve 73. Thus, ink delivered from the replenishment pump 72 can be prevented from flowing back from the vicinity of the connection point 655 toward the circulation pump 71.

Further, in the above-described preferred embodiment, as an example of the circulation pump 71 and the replenishment pump 72, there has been described a pump having a configuration in which the piston 713 rocks as a rotating shaft of a motor (the circulation motor 714 and the replenishment motor 724) reciprocally turns. However, each of the circulation pump 71 and the replenishment pump 72 is not limited to the pump having the above-described configuration. For each of the circulation pump 71 and the replenishment pump 72, various types of pumps can be employed. For example, a pump having a configuration in which a rotating shaft of a motor rotates all around in one direction and the all-around rotation is converted to rocking motion, reciprocation, or the like of a piston by an appropriate cam mechanism, may be employed. Also in this case, it is desirable that the replenishment motor 724 of the replenishment pump 72 has a rotation period (driving period) shorter than a rotation period (driving period) of the circulation motor 714 of the circulation pump 71.

Moreover, the respective elements described in the above-described preferred embodiment and modifications may be appropriately combined unless contradiction occurs.

What is claimed is:

1. An inkjet printing apparatus that discharges ink onto a printing medium to perform printing, comprising:

a discharge head configured to discharge ink from a nozzle;

a supply tank in which ink supplied to the discharge head is stored;

a collecting tank in which ink collected from the discharge head is stored;

a connecting pipe that connects an internal chamber of the supply tank and an internal chamber of the collecting tank such that the internal chambers communicate with each other;

a circulation pump that is interposed in the connecting pipe and is configured to perform a liquid-delivery operation of delivering ink from the collecting tank to the supply tank;

a replenishment tank in which ink with which the supply tank is replenished is stored;

a replenishment pipe that connects an internal chamber of the replenishment tank and an internal passage of the connecting pipe such that the internal chamber and the internal passage communicate with each other; and a replenishment pump that is interposed in the replenishment pipe and is configured to perform a liquid-delivery operation of delivering ink from the replenishment tank to the connecting pipe, wherein the replenishment pipe has a downstream end, relative to the replenishment pump, connected to the connecting pipe at a connection point positioned between the circulation pump and the supply tank in the connecting pipe.

2. The inkjet printing apparatus according to claim 1, wherein the smallest passage diameter in the circulation pump is equal to or larger than the smallest passage diameter in the replenishment pump.

3. The inkjet printing apparatus according to claim 2, wherein the smallest passage diameter in the circulation pump is larger than the smallest passage diameter in the replenishment pump.

4. The inkjet printing apparatus according to claim 1, wherein the circulation pump includes a circulation motor configured to pressurize ink therein and deliver the ink to the supply tank, the replenishment pump includes a replenishment motor configured to pressurize ink therein and deliver the ink to the connection point, the inkjet printing apparatus further comprises a control unit configured to control driving of the circulation motor and the replenishment motor, the control unit comprises a storage unit that stores a computer program, and a processor that is configured to control the operations of the circulation motor and the replenishment motor in accordance with the computer program, the processor performs circulation control, driving the circulation motor to deliver ink to the supply tank in accordance with the computer program, and also performs replenishment control, driving the replenishment motor to deliver ink to the connecting pipe while continuing to drive the circulation motor in accordance with the computer program, and in the replenishment control, the replenishment motor has a driving period shorter than a driving period of the circulation motor.

5. The inkjet printing apparatus according to claim 4, wherein the processor performs control the operations of the circulation motor and the replenishment motor in accordance with the computer program, so that a flow amount of ink delivered from the circulation pump per unit time in the circulation control is larger than a flow amount of ink delivered from the replenishment pump per unit time in the circulation control.

6. The inkjet printing apparatus according to claim 4, wherein the processor performs control the operations of the circulation motor and the replenishment motor in accordance with the computer program, so that a flow amount of ink delivered from the replenishment pump per unit time in the replenishment control is larger than a flow amount of ink delivered from the circulation pump per unit time in the replenishment control.

7. The inkjet printing apparatus according to claim 4, further comprising:

a first liquid-level sensor configured to detect that a liquid level of ink stored in the internal chamber of the supply tank is at a height of a first reference value, and output a first signal; and a second liquid-level sensor configured to detect that a liquid level of ink stored in the internal chamber of the supply tank is at a height of a second reference value higher than the first reference value, and output a second signal, wherein the control unit starts the replenishment control in response to the first signal output from the first liquid-level sensor, and stops the replenishment control in response to the second signal output from the second liquid-level sensor.

8. The inkjet printing apparatus according to claim 1, further comprising:

a heater that is interposed in the connecting pipe and is configured to heat ink delivered through the internal passage of the connecting pipe, wherein the heater is positioned between the connection point and the supply tank in the connecting pipe.

9. The inkjet printing apparatus according to claim 1, further comprising:

a deaeration unit that is interposed in the connecting pipe and is configured to remove bubbles in ink delivered through the internal passage of the connecting pipe, wherein the deaeration unit is positioned between the connection point and the supply tank in the connecting pipe.

10. The inkjet printing apparatus according to claim 1, further comprising:

a first filter that is interposed in the replenishment pipe and is configured to filter ink delivered through an internal passage of the replenishment pipe; and a second filter that is interposed in the connecting pipe and is configured to filter ink delivered through the internal passage of the connecting pipe, wherein the second filter is positioned between the connection point and the supply tank in the connecting pipe, and the first filter has a filtering diameter equal to or larger than a filtering diameter of the second filter.

11. The inkjet printing apparatus according to claim 1, wherein the replenishment pump is configured to perform a liquid-delivery operation of delivering ink from the replenishment tank to the connection point.

12. The inkjet printing apparatus according to claim 1, further comprising:

a supply-side manifold and supply-side branch pipes configured to connect the supply tank and the discharge head; and collecting-side branch pipes and a collecting-side manifold configured to connect the discharge head and the collecting tank, wherein an ink circulation path is formed by the supply tank, the supply-side manifold, the supply-side branch pipes, the discharge head, the collecting-side branch pipes, the collecting-side manifold, the collecting tank, and the connecting pipe, and only one of the circulation pump is provided in the ink circulation path.

* * * * *